INVENTOR.
ARTHUR H. LONG

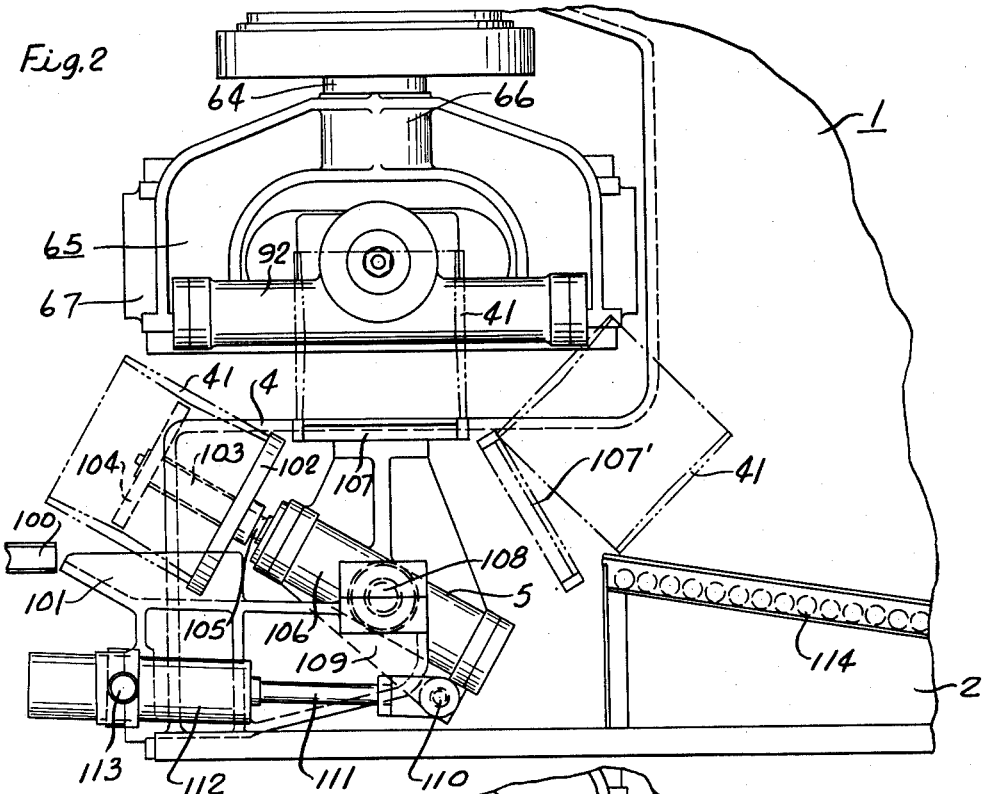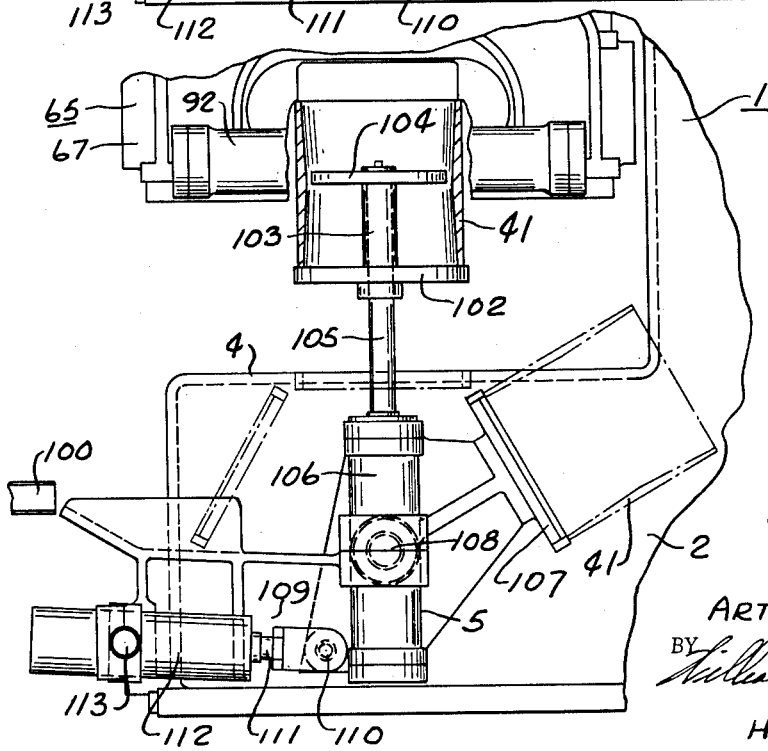

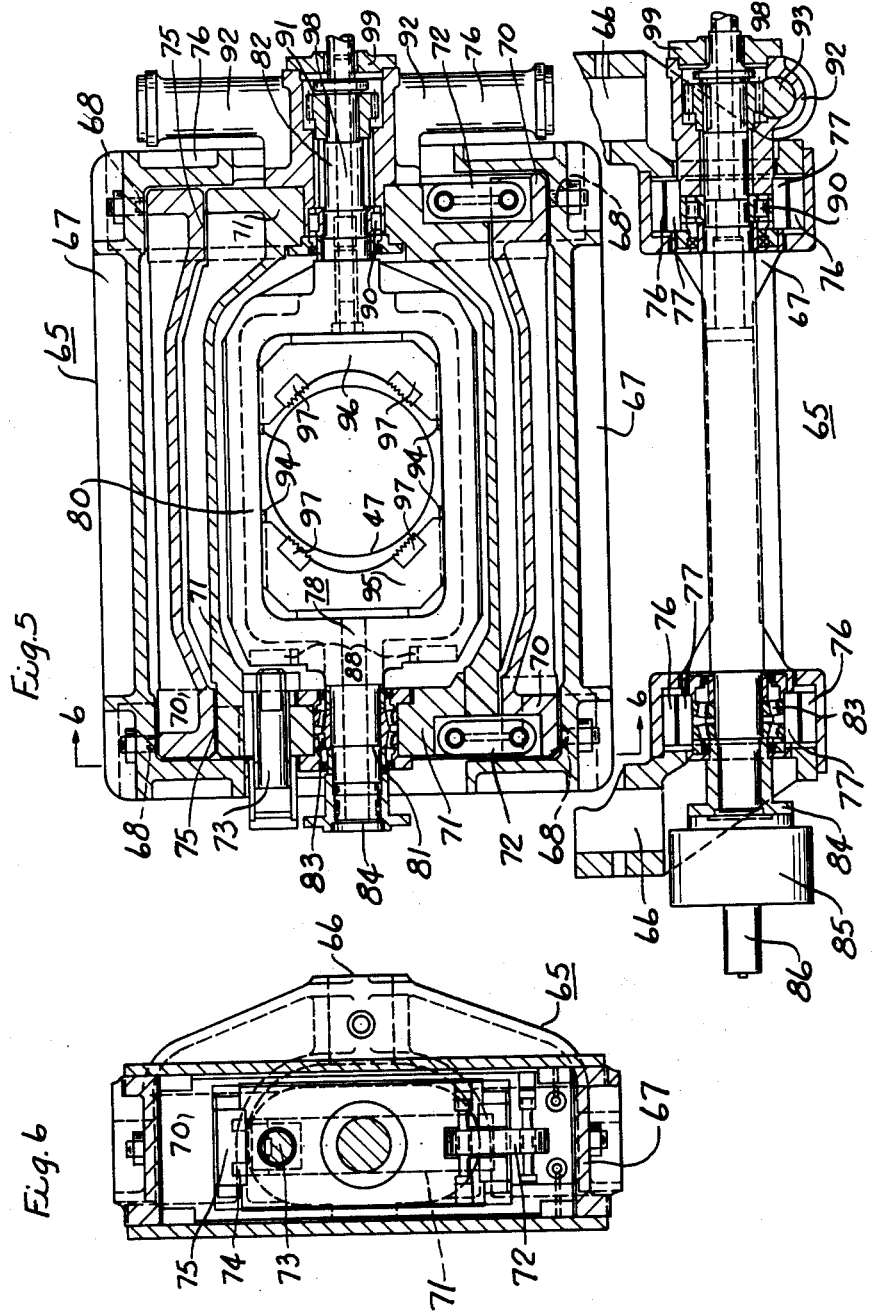

Sept. 1, 1964  A. H. LONG  3,146,472
TAPPING MACHINE WITH MEANS TO COUNTERBALANCE
TOOL CARRIAGE AND WORK HOLDER
Filed Dec. 8, 1959  8 Sheets-Sheet 5

INVENTOR.
ARTHUR H. LONG
BY
HIS ATTORNEY

Sept. 1, 1964 A. H. LONG 3,146,472
TAPPING MACHINE WITH MEANS TO COUNTERBALANCE
TOOL CARRIAGE AND WORK HOLDER
Filed Dec. 8, 1959 8 Sheets-Sheet 6
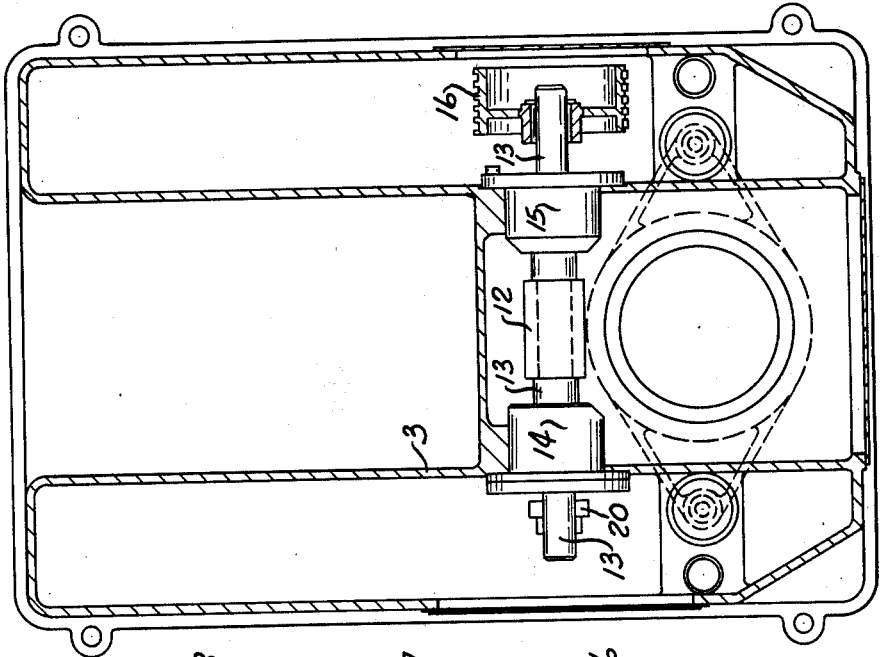
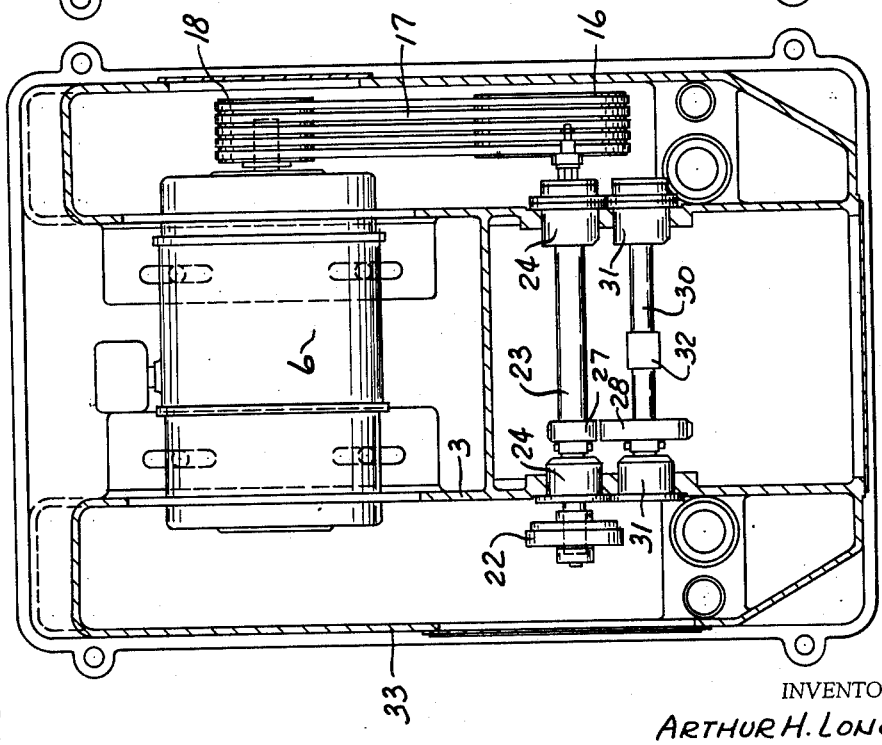
INVENTOR.
ARTHUR H. LONG
BY
HIS ATTORNEY

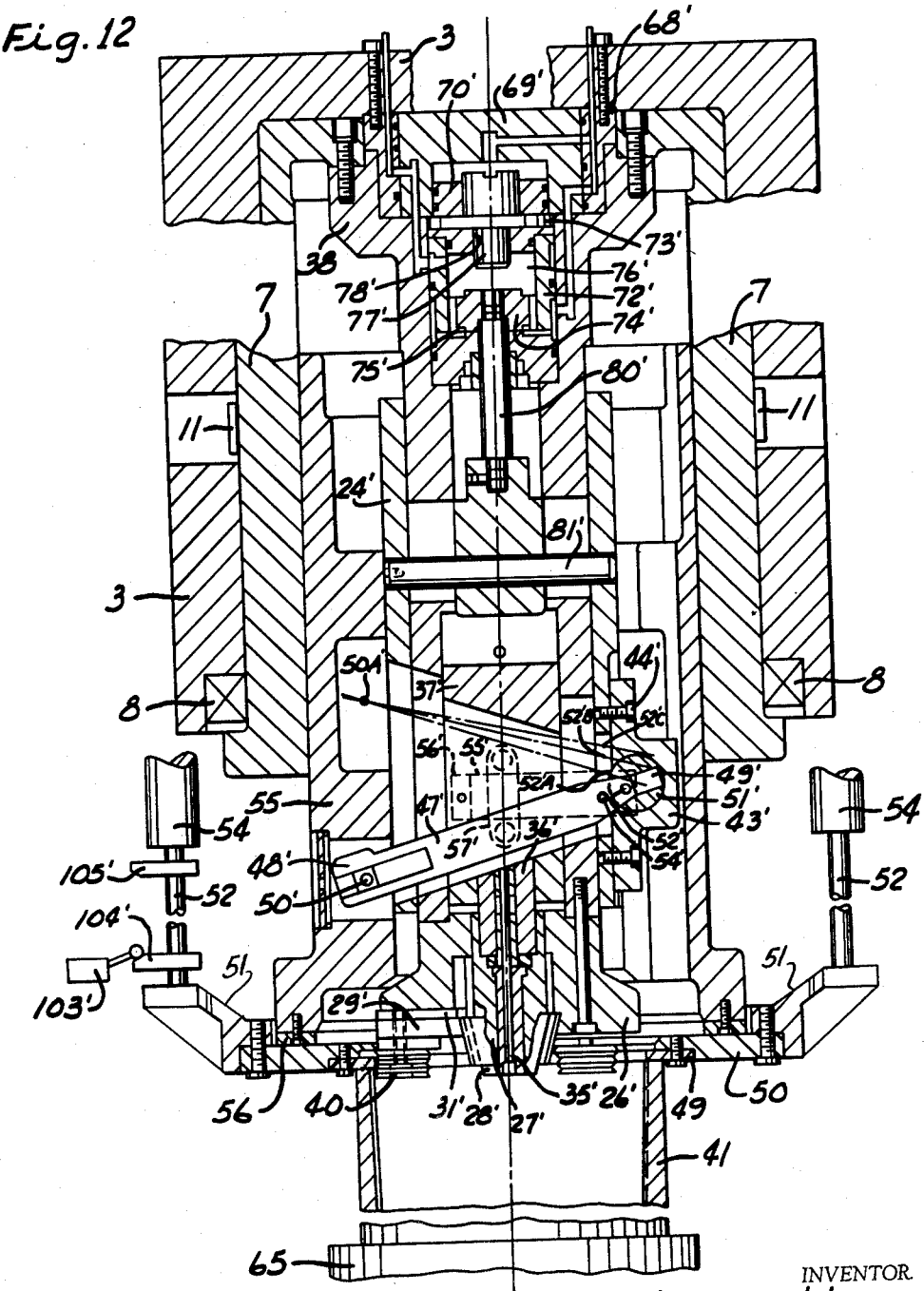

3,146,472
TAPPING MACHINE WITH MEANS TO COUNTERBALANCE TOOL CARRIAGE AND WORK HOLDER
Arthur H. Long, Mount Lebanon, Pa., assignor to Wm. K. Stamets Company, Pittsburgh, Pa., a corporation of Pennsylvania
Filed Dec. 8, 1959, Ser. No. 858,248
25 Claims. (Cl. 10—139)

This invention relates generally to thread cutting machines and more particularly to thread cutting machines for tapping or chasing threads in pipe couplings.

The principal object of this invention is the provision of a machine for rigidly mounting the tap in a rotary spindle with very little overhang.

Another object is the provision of a threading machine having rotary threading means capable of cutting a tapered thread in a coupling as it is moved axially on the threading means.

Another object is the provision of a threading machine having rotary threading means to cut threads on an axial movable workpiece with means to feed and balance the weight of the workpiece during the threading operation.

Another object is the provision of a threading machine having a threading means rigidly mounted for rotation and against axial movement to cut threads on an axial movable nonrotary workpiece. This machine not only provides less weight to counter balance when axially feeding the workpiece but also provides an improved structure for loading and unloading the workpiece.

Another object is the provision of a fluid actuated balance for axially moving a workpiece relative to a rotary threading means that is held against axial movement permitting the workpiece to be moved clear for re-orientation and loading and unloading.

Another object is the provision of an improved spindle mounting for receiving a threading means which not only permits the spindle to be rigidly supported by rotary bearings but also provides very little overhanging from the bearings and thereby reduces the height, size and weight of the machine.

Another object is the provision of an improved hollow spindle for receiving an improved threading mechanism.

Another object is the means for providing a rapid and slow axial feed of a workpiece relative to a rotary threading means together with a control of the same.

Another object is the provision for a novel mode of loading and unloading workpieces to a threading machine.

Other objects and advantages appear hereinafter in the following description and claims.

The accompanying drawings show for the purpose of exemplification without limiting the invention and claims thereto, certain practical embodiments of the invention wherein:

FIG. 2 is a view in vertical section illustrating the mechanism below the machine for inserting and removing couplings from the machine shown in FIG. 1.

FIG. 4 is a view in vertical section illustrating the mechanism below the machine for inserting and removing couplings from the machine shown in FIG. 1 with the coupling elevator extended.

FIG. 5 is a plan view partly in section of the work supporting chuck.

FIG. 6 is a view in section taken along the line 6—6 of FIG. 5.

FIG. 7 is a view partly in vertical section of the chuck mechanism shown in FIG. 5.

FIG. 10 is a view in horizontal section showing the spindle drive.

FIG. 11 is a view in horizontal section showing the counter shaft worm feed drive.

FIG. 12 is a sectional view showing in more detail the operation of the taper producing member of the thread cutting machine.

Figure 1:
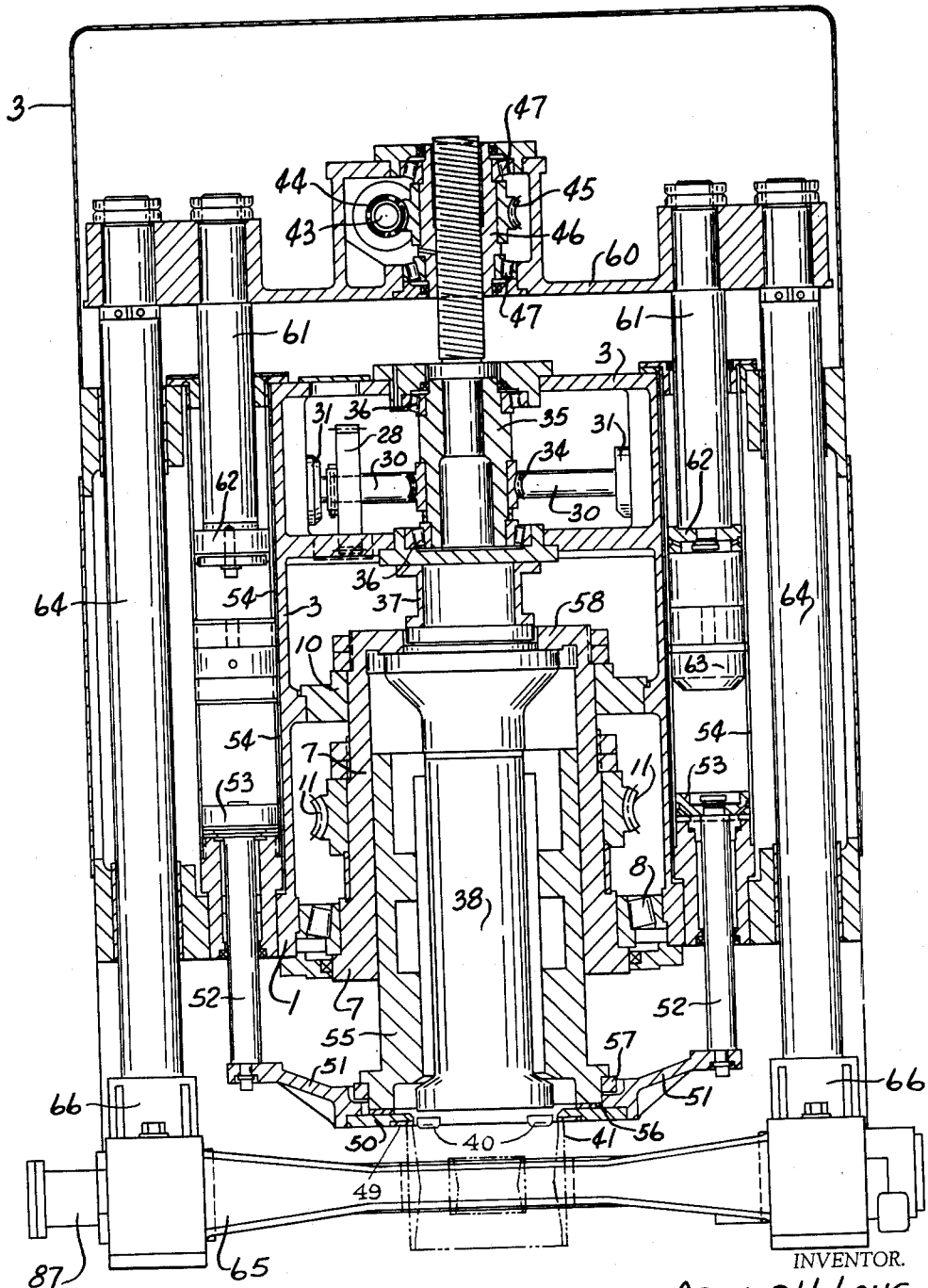
FIG. 1 is a view in vertical section of the machine comprising this invention and showing the drives for feeding the workpiece and for showing the feed and rapid traverse of the workpiece and the rotary drive of the spindle.
Figure 3:
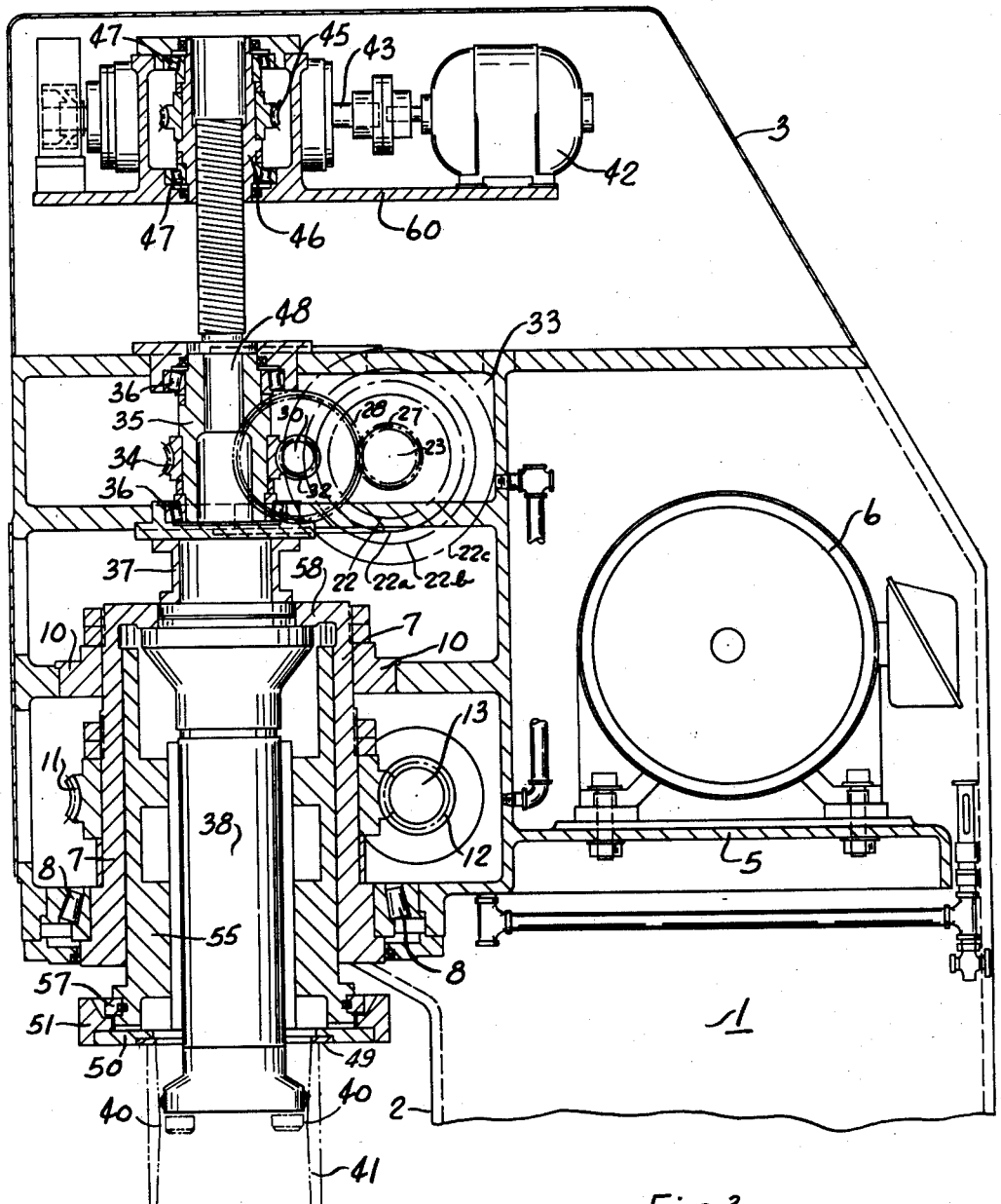
FIG. 3 is a view in vertical section illustrating the relative positions of the feed and rapid traverse of the workpiece and the rotary spindle drive.

Referring to the drawings the machine frame 1 has the base portion 2 and a head portion 3 that is generally C-shaped with a platform 4 in which is mounted the coupling loading and unloading mechanism indicated at 5. The upper portion 3 is provided with a shelf 5' at the rear for supporting the rotary motor 6 and in the front of the upper section the spindle 7 is rotatably supported by the antifrictional bearings 8 and the sleeve bearing 10. The drive spindle 7 is provided with a worm gear 11 driven by the worm 12 and main drive shaft 13 which as shown in FIG. 10 is supported in the bearings 14 and 15. The outer end of the shaft 13 is provided with the dual belt drive pulley 16 which in turn carries the endless V-belt 17 driven by the pulley 18 from the motor 6 as shown in FIG. 11.

Figure 8:
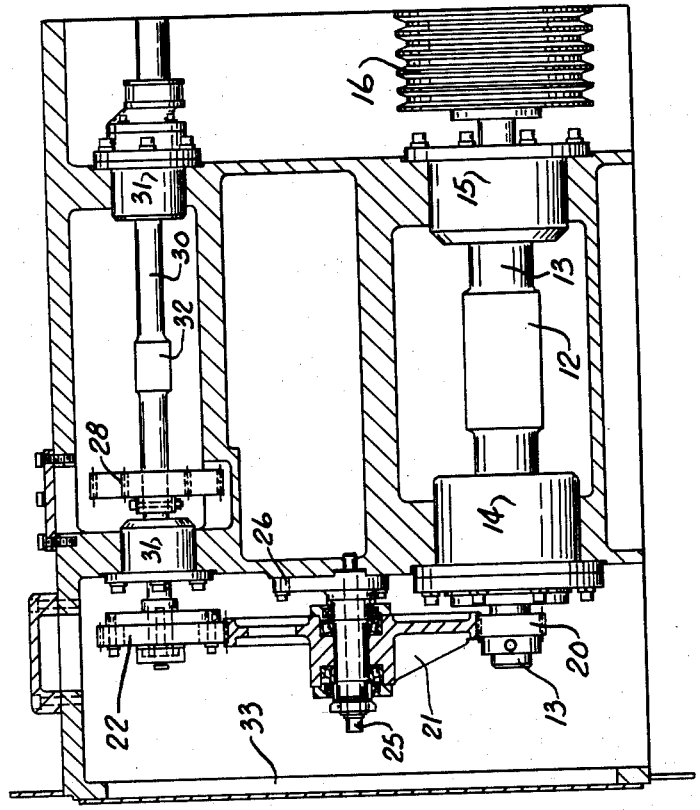
FIG. 8 is a view in horizontal section of the spindle drive.
Figure 9:
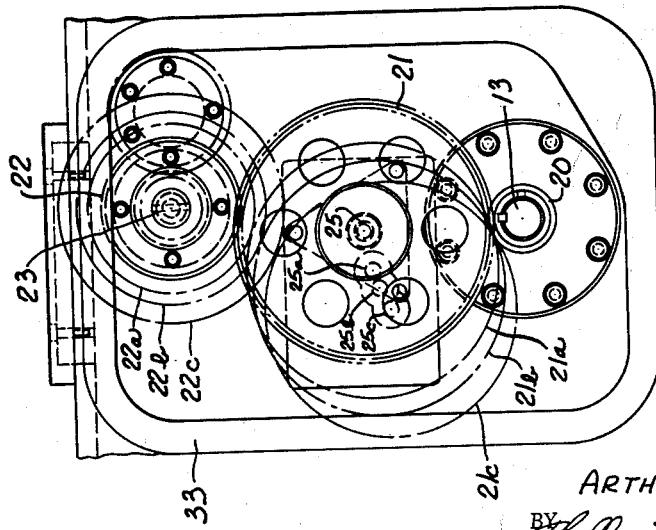
FIG. 9 is a view in elevation of the gear change of the spindle drive for different sizes of workpiece.

The other end of the shaft 13 has the pinion 20 which meshes with the variable or changeable gear 21 that in turn meshes with the second variable or changeable gear 22 on one end of the counter feed shaft 23 carried by the bearings 24. The gear 22 of course, will be changed every time the gear 21 is changed in order to provide different feeding ratios of the threading device. In order to accomplish this the counter shaft 23 is fixed. However, the shaft 25 that rotatably supports the gear 21 is mounted on the plate member 26 that can be adjustably positioned to receive different size gears 21 and as illustrated in FIG. 9 the gear 21 may be replaced by the gears 21a, 21b, 21c and the gear 22 correspondingly is replaced by the gears 22a, 22b and 22c. Thus by having four gears 21, 21a, 21b and 21c and the plate structure 26 which enables the shaft 25 to be moved to the positions 25a, 25b and 25c, this enables one to get a considerable number of different speeds in the counter shaft 23. The counter shaft 23 has a pinion 27 that meshes with the gear 28 on the feed shaft 30 supported by the bearings 31. Intermediate of the feed shaft 30 is provided the feed worm gear 32 as shown in FIGS. 8 and 11.

These gears are placed in the enclosure in the side of the machine as indicated at 33.

The feed worm 32 meshes with the worm gear 34 fixed to the rotary sleeve 35 carried by the bearings 36 in the upper frame 3. A stationary housing 37 extends down to the head 58 of the spindle 7.

The thread cutting member or tap core 38 is mounted on the spindle 7 and is rotated thereby. The spindle 7 is rotatably supported by the bearings 8 and 10 and is held against axial movement by these bearings. When the tap core 38 is rotated and the coupling is raised the thread chasers carried by the tap core cut the threads as the coupling moves upwardly over the end of the tap core. However, when the coupling is fully threaded or when the chasers reach the inner end of the threaded section the chasers are collapsed within the tap core and the coupling is withdrawn from the tap core 38 by the rapid traverse mechanism consisting of the motor 42 which is coupled directly to the shaft 43 carried by suitable bearings to rotate the worm 44 that meshes with the worm gear 45 on the sleeve or nut 46 carried by the bearings 47 for rapidly rotating the sleeve which has a steep pitch thread that meshes with the thread on the exterior of the shaft 48 for rapidly raising or retracting the coupling. The tap core 38 is rotated but held from axial movement and requires an exterior tap sleeve slidable thereover to move the thread chasers radially to form a tapered thread which structure is found in tapping machines well known in the prior art and as shown by the Drissner et al. Patent 2,024,278, entitled Collapsible Pipe Tap, dated December 17, 1935. As shown in FIG. 1 the hard ring 50 is supported by the nonrotary spider 51 through the weight compensating piston rods 52 having their pistons 53 operating in the cylinders 54. These are double cylinder and piston structures and when the coupling engages the hard ring supporting the weight and force of the rotary tap sleeve 55 in readiness to operate the tap core 38, the chasers are fed to tap the interior of the coupling 41. The tap sleeve 55 which operates the thread chasers is slidably mounted in the bore of the spindle sleeve 7 and rotates therewith as there is a spline connection as shown in FIG. 1 between the tap sleeve 55 and the bore of the spindle sleeve 7. The bottom of the tap sleeve 55 is provided with a Teflon bearing ring 56 which engages the top of the hard ring 50. A trip ring 49 engages the bottom of the hard ring 50. Another type of steadier is provided in the annular bearing rings 57 to provide for the lateral support of the tap sleeve 55 and the thread chasers.

As shown in FIG. 1 the tap sleeve 55 is extended for its full stroke and is spaced from the upper end or head 58 of the sleeve as indicated. However, the tap core 38 is still within the tap sleeve 55. The structure that moves the tap sleeve 55 and the tap core and expands and contracts the thread chasers represent well known structural details in this character of threading tap core and are therefore not illustrated in detail.

Since this is a vertical machine it is obvious that the spider 51 supports the load or the weight of the tap sleeve 55 together with the force required to be applied thereto for actuating the tap core which is representative as a weight to be counter balanced by supplying a counter balancing fluid pressure under the pistons 53. However, the movement of the pistons 53 within the cylinders 54 to determine the extent and the feed of the tap core and the tap sleeve 55 is of course determined by the feed or the rapid traverse of the threaded shaft 48, the fluid pressure under the pistons 53 being greater than the total load on the spider 51 thus urging the whole assembly upwardly against the threads of the shaft 48 removing the load thereon which aids in the operation of the rapid traverse.

Referring to FIG. 12 as well as FIG. 1, a trip sleeve or trip member 24' is coaxially disposed within the sleeve 55 and may axially slide therewith. A tap core 38 is fixedly attached to the spindle 7 and extends coaxially inside the trip sleeve 24'. A nosepiece 26' is attached to the end of the tap body 38 and coaxially supports a corepiece 27'. The corepiece 27' has conical dovetail slots 28' to interengage with a plurality of chaser blocks 29' carrying the chasers 40. The chaser blocks interengage with radial dovetail slots 31' in order to hold these chaser blocks 29' on the nosepiece 26'. The dovetail slots 28' and 31' may be any form of interengaging surfaces permitting sliding movement along a path, yet preventing disengagement of the two parts in a direction perpendicular to this path. The conical dovetail slots 28' are a form of sloping interengaging surfaces which are cam surfaces, since upon axial movement of the corepiece 27', these chaser blocks 29' will move radially.

The corepiece 27' is splined with the shaft 36'. The splined shaft 36' has a splined connection with and is retained in a corepiece shank 37'. The corepiece 27' and the corepiece shank 37' move axially as a unit. Such movement effects radial or lateral movement of the chasers 40 by means of the conical dovetail slots 28'.

A yoke 43' is fastened to the trip sleeve 24' by any suitable means, such as bolts 44'. A taper control lever 47' has one end 48' pivotally connected by a swivel pin 50' to the tap housing 55 and its other end 49' is pivoted at 52' with the yoke 43' at the swivel disc 51' which has been made large in diameter to absorb the thrust. This fulcrum pin 52' extends into the hole 54' and also into two drawback arms 55' which are mounted in transverse slots 56' in the corepiece shank 37'. Clamps 57' retain the drawback arms 55' to the corepiece shank 37'.

The chuck 65 moves the workpiece 41 axially upwardly, the workpiece moves the tap housing sleeve 55 upwardly and this recedes the swivel pin 50' a first distance to a position 50'A, as shown by dot-dash lines in FIGURE 12. This taper control lever 47' thus pivots about the second end thereof in the swivel disc 51' and the fulcrum pin 52' recedes a second distance 52'A which is small relative to the first distance. This receding movement moves the drawback arms 55', and hence, causes the receding movement of the corepiece shank 37' and the corepiece 27'. Because of the conical dovetail slots 28', the chaser blocks 29' and chasers 40 are moved radially inwardly. Thus, it will be seen that as the workpiece and chasers axially move relative to each other in a tapping direction, the taper control lever 47' recedes and through its mechanical advantage of the lever itself plus the cam surface of the conical slots 28', the chasers move radially inwardly a small amount so that a taper thread 13' is formed in the workpiece 41.

The upper or rear end of the tap body or core 38 contains a stationary fluid distributor 68' which is coaxially fixed to the frame 3. A first cylinder 69' is coaxially mounted in the fluid distributor 68' and is fixed to the core 38 to rotate with this core and the spindle 7. A first piston 70' slides inside the first cylinder 69'. A second cylinder 72' is fixed inside the core 38 below the first cylinder 69'. A plate 73' separates the first and second cylinders and a second piston 74' slides within the second cylinder 72' and forms first and second compartments 75' and 76' therein. Conduits are provided from the fluid distributor 68' to the first and second compartments 75' and 76' and to the upper or rear of the first cylinder 70'. A flanged stop rod 77' is movable in an aperture 78' in the plate 73'. As such, this stop rod 77' is abuttable with both pistons 70' and 74'. A piston rod 80' connects the second piston 74' to a drawback pin 81', which, in turn is fastened in the trip sleeve 24'.

Figure 13:
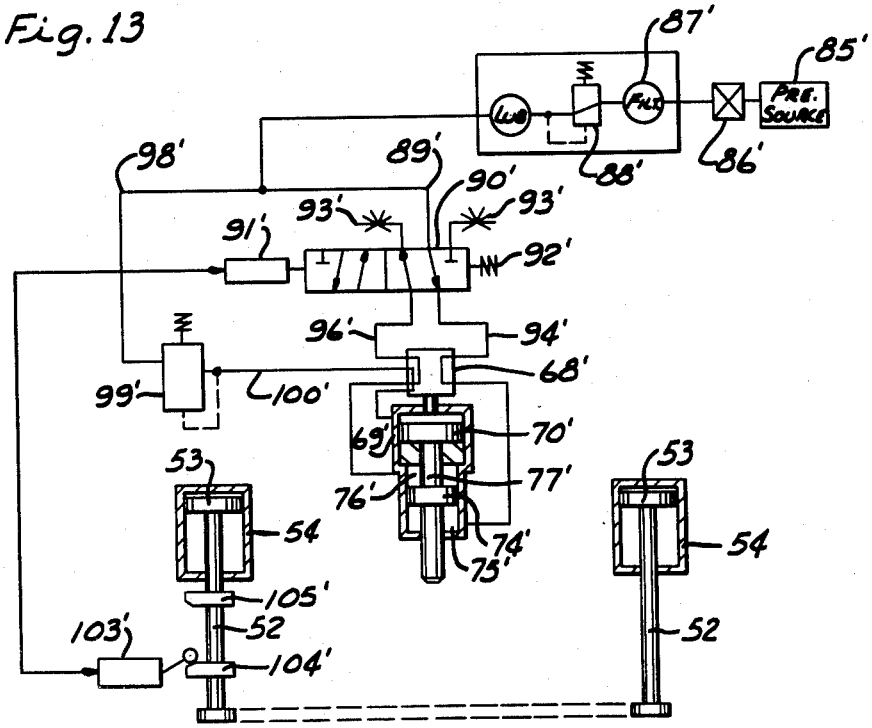
FIG. 13 is a schematical drawing of portions of the thread cutting machine and its electrical and fluid circuits.

FIG. 13 shows schematically portions of the threading machine 10 and shows the electrical fluid circuits.

A fluid pressure source, such as an air pressure source 85', is connected through a valve 86' and a filter 87' to a pressure regulator 88'. From this pressure regulator a conduit 89' supplies a fluid under substantially constant pressure to a four-way valve shown diagrammatically at 90'. This four-way valve is actuated by a solenoid 91' between first and second conditions, and the first condition is shown in FIG. 13 when the solenoid 91' is actuated and with a spring 92' extended. The four-way valve has exhaust connections to a drain 93' and has first and second conduits 94' and 96' which pass through the fluid distributor 68' to the first and second compartments 75' and 76', respectively, on either side of the second piston 74'. A substantially constant fluid pressure is also supplied from the pressure regulator 88' through a conduit 98' to another pressure regulator 99' and then by a third conduit 100' through the fluid distributor 68' to the upper end of the cylinder 69' to act on the first piston 70'. A limit switch 103', of the maintained contact type, has first and second conditions, and FIG. 13 shows this switch in the first condition as actuated by a first dog 104' connected to the counterbalance cylinder piston rod 52' to move with the sleeve 55. This first condition of the limit switch 103' is a closed contact condition to energize the solenoid 91'. This first condition of the limit switch 103' is caused by completion of tapping movement when the sleeve 55 and the taper control lever 47' has moved the first distance to the receded position. At this point the first dog 104' actuated the limit switch 103' to the closed condition as an incidence of completion of the tapping operation. When the sleeve 55 has advanced downwardly to the position shown in FIGURE 1, then a second dog 105' actuates the limit switch 103' to a second condition which is an off condition to de-energize the solenoid 91'.

When the dog 104' actuates the limit switch 103' to energize the solenoid 91' and move the four-way valve 90', the provides fluid pressure in the first conduit 94' and into the first compartment 75' upwardly to retract the second piston 74'. As seen in FIGURE 12, this retracts the piston rod 80', the drawback pin 81' and the trip sleeve 24' a third distance to retract the fulcrum pin 52' a fourth distance to a point 52'B. This fourth distance is nearly equal to the third distance because the taper control lever 47' at this time pivots about the first end at the swivel pin 50'. This retraction through the fourth distance retracts the corepiece shank 37' and the corepiece 27' this same fourth distance and this movement takes place quite rapidly, which imparts a rapid collapsing movement to the chasers 40. This collapsing movement of the chasers 40 is rapid because it is as rapid as movement of the second piston 74'. This collapsing movement of the chasers 40 permits the thread forming surfaces thereon to be completely separated from the newly formed thread on the workpiece 41, and hence, the chasers 40 and the workpiece 41 may be axially separated without unthreading the same.

The first cylinder 69' and piston 70' provides a third movement to the taper control lever 47' which permits radial removal of the chaser blocks 29' so that the chasers 40 may be sharpened or may be replaced with chasers of different sizes for threading a different diameter workpiece. Because of the radial dovetail slots and the conical dovetail slots 28', the chaser blocks 29' are firmly held on the nosepiece 26'. To radially remove these chaser blocks, they must be disconnected at the corepiece 27' which means that this corepiece 27' must be axially moved upwardly sufficiently to disengage the conical dovetail slots 28'.

With the threading machine in the position which it assumes at the completion of a threading operation, which is with the tap sleeve 55 in its upper receded position and with the second piston 74' moved upwardly by pressure in the first compartment 75', then the fulcrum pin 52' is in the position 52'B. At this time the pressure regulator 99' may be actuated manually, for example, to reduce the pressure in the conduit 100'. This normally is substantially the same pressure as applied to compartments 75' and 76' and since the upper end of the piston 70' has a larger area than the area in the second compartment 76', this means that the first piston 70' is moved downwardly to move the stop rod 77' downwardly. This prevents the second piston 74' from moving upwardly to the end of the second cylinder 72'. Now with the pressure reduced at the upper end of the first piston 70', the pressure in the first compartment 75' moves the second piston 74' and the stop rod 77' upwardly a fifth distance. This retracts the piston rod 80', the drawback pin 81' and the trip sleeve 24' this same fifth distance. The taper control lever 47' pivots about the swivel pin 50' and, hence, the fulcrum pin 52' recedes a sixth distances to a position 52'C. This recedes the corepiece 27' this same sixth distance and this is sufficient to completely disengage the conical dovetail slots 28' on the corepiece 27' from the chaser blocks 29'. Since the tap housing sleeve 55 is moved upwardly to its upper limit, it is out of the way so that the chaser blocks 29' may then readily be removed from the nosepiece 26' for the sharpening or replacement.

The tap core is, of course, an automatic device and can be made to cooperate with the other structural members of the machine to produce a complete automatic cycle in approaching the coupling with a rapid traverse through the motor 42 operating the sleeve nut 46 to rapidly raise the same on the threaded shaft 48 and thus the coupling until it is within an inch or so from the tap core. Thence the feed shaft 30 and worm feed 32 take over to rotate the threaded shaft and feed the structure slowly upwardly until the hard ring is engaged by the top of the coupling and further feed is effective to move the tap sleeve 55 which operates the thread chasers radially to form a taper as the coupling continues to move over the tap core to run the chasers into the coupling and form the threads.

The rapid traverse motor 42 and its associated structure including the worm drive is mounted on the carriage or cross head 60. This cross head is supported by the threaded shaft 48 but is counterbalanced by the pressure on the piston rods 61 that are provided with the piston heads 62 operating within the cylinders 54. The upper and lower chambers of the cylinders 54 are separated by the dividers 63. The lower portion of the chamber above the pistons 53 is open to atmosphere, however, above the divider 63 a fluid pressure is supplied under the pistons 62 for the purpose of supplying a counterbalance force for the weight of the cross head 60 and the suspension rods 64 which are attached to the cross head 60 at their upper ends and suspend the self-centering chuck mechanism indicated generally at 65 and the coupling being threaded. As shown in detail in FIGS. 5, 6 and 7 the opposite ends of the self-centering chuck are provided with the sockets 66 to receive the suspension rods 64. These sockets, of course, are not shown in FIG. 5 but are illustrated in FIGS. 1, 6 and 7. These sockets are integral with the outer frame 67 which is referred to as the stationary frame and as shown in FIG. 5 this frame is provided with the adjustable rubber bumpers 68 at each of its four corners. This frame is substantially rectangular and the bumpers 68 face inwardly to engage and limit the movement of the inner frame 70 in the direction toward and away from the bumpers. These resilient bumpers actually engage the front and back of the intermediate frame 70 and this frame is keyed or otherwise secured against axial movement but may have lateral movement against the bumpers. These bumpers being under partial compression of course will be relieved on one side when the intermediate frame 70 moves in one direction while the bumpers on the opposite side of course will be further compressed. However, the intermediate frame 70 can move laterally within the stationary frame 67. A floating frame 71 is supported within the intermediate frame and this floating frame is supported within the intermediate frame 70 by means of the links 72. This permits the floating frame to move longitudinally within the intermediate frame 70 and thus the floating frame has movement in any direction owing to the fact that the intermediate frame permits it to move laterally with it and the floating frame may be moved longitudinally by the links 72. After the coupling has been centered the floating frame 71 is locked with a lock which is actuated by a pneumatic cylinder 73 mounted in the stationary frame and which is provided with a piston that extends outwardly and has a lock wedge on its outer end to engage and lock the open frame 80 and thus the floating frame 71. The floating frame 71 is provided with the key 74 that fits into the blocks 75 contained within the intermediate frame 70. These blocks and keyways interlock the intermediate frame to permit the movement owing to the links 72 but support the frame on the opposite side of the chuck from the links 72 and at both ends of the intermediate frame 70.

In a similar manner, the intermediate frame 70 is mounted for the limited lateral movement between the rubber bumpers 68 by means of the slide blocks 76 and 77 as shown in FIG. 7 which function as bearing plates and the blocks 76 are secured to the stationary frame 67 where the blocks 77 are secured to the intermediate frame 70. Any undue wear on these bearing surfaces can readily be taken care of by replacing the block slides 76 and 77. Thus the slide blocks permit the lateral movement of the intermediate frame 70 within the stationary frame 67 within the limit of the deformation of the rubber bumpers 68 and the links 72 permit the longitudinal movement of the floating frame 71 within the intermediate frame 70 and thereby provide for movement of the work carrying chuck in a single plane in two directions at right angles to each other which provides a compound movement that permits centering of the workpiece in any direction. Such a self-centering chuck is illustrated in Patent 1,967,507.

The workpiece or coupling 41 is mounted in the chuck member 78 which is in the form of an open frame 80 having shafts 81 and 82 extending from opposite ends thereof. The shaft 81 is journaled in the bearings 83 and is provided with a coupling clutch portion 84 on the outer end for rotating the open frame of the chuck member. As shown in FIG. 7 the coupling clutch portion 84 is connected to the driving portion 85 and the shaft 86 for connection with the servomotor 87 shown in FIG. 1.

The shaft 82 at the opposite end of the open frame is carried by the roller bearings 90 and is provided with the gear member 91 that meshes with the rack 93 disposed within the cylindrical casing of the servomotor 92 that extends on both sides of the shaft 82 and is provided with a piston at its opposite ends that rides in the cylinder of the servomoter 92. Thus by energizing opposite ends of the cylinder of the servomotor 92, the rack 93 is moved back and forth to actuate the gear 91 and thus flop the open frame 80.

The open frame 80 is provided with a socket 88 for receiving the wedge on the end of the piston 73 for the purpose of locking the open frame 80 within the floating frame 71. The control and operating circuit is provided with an interlocked arrangement that prevents the functioning of the servomotor 92 until after the locking piston 73 is retracted and as soon as the servomotor 92 functions to flop the open frame 80 the circuit is arranged to energize the piston 73 to again lock the open frame in its opposite position. In this manner both sides of the coupling may be tapped from one chucking of the coupling.

The open frame 80 of the chuck member has the case 94 to receive the chuck sections 95 and 96. The chuck sections 95 and 96 are provided with the jaw grippers 97 which are locked at a specific place in the chuck sections to receive the coupling at a specific position on the chuck sections 95 and 96 so as to properly fit and grip the coupling 41. The chuck sections 95 and 96 may be slid to the center portion of the opening in the frame 80 and removed laterally therefrom as the key section 94 do not extend across the opening and are spaced from each other an adequate distance to remove or replace other size chuck members 95 and 96 according to the diameter of the coupling to be used. The chuck member 95 is seated against the frame 80, whereas the chuck member 96 is attached to the inner stem 98 that is provided with the threaded section and when rotated by the gear 99 through a suitable power source will force the stem and the chuck section 96 inwardly to grip the coupling in the four gripping members 97. In this manner each coupling when received is engaged by the grippers and is held by the chuck mechanism until one side is threaded and then the servomotor 92 reverses the chuck member so that the other side of the chuck or the coupling may be threaded in the same manner. When the coupling is threaded on both sides the gear 99 is then energized by a servomotor to withdraw the chuck jaw member 96 and release the coupling 41.

Referring specifically to FIG. 2 the coupling loading and unloading mechanism includes a conveyor 100 which delivers the couplings to the receiving pocket 101 where the coupling is permitted to be pushed laterally onto the gauge plate 102 which has extending outwardly therefrom the post 103 which carries the centering disc 104 that has clearance in the bore of the coupling.

The gauge plate 102 is supported on the piston rod 105 that is provided with a piston head that operates in the cylinder 106. The cylinder 106 is formed as an integral casting with the gauge plate 102 and the receiving plate 107 being spaced approximately 45° from each other and the casting which makes them integral is provided with laterally extending pivots 108 that are journaled in the bottom section 2 of the frame 1. The lower end of this casting is provided with a laterally extending portion 109 that carries the pivot 110 connected to the piston 111 that operates in the cylinder 112. The cylinder 112 is also pivotally supported at 113 in the bottom section 2 of the frame 1. The servomotor represented by the piston 111 operating in the cylinder 112 is a double acting motor that functions to tilt the casting back and forth with the receiving plate being shifted from the position shown in the vertical position in a clockwise manner to the position indicated by the receiving plate marked 107′.

When the coupling 41 has been released it drops to the plate 107 in position for the coupling 41 to be delivered to the conveyor 114 as a finished product insofar as the threading is concerned. When the receiving plate 107 is transferred from its upright position shown in full lines in FIG. 2 under the thread chasers to the position shown in dotted lines in the same view to the right at 107′ and the next newly deposited coupling 41 on the gauge plate 102 is delivered to the vertical position the cylinder 106 is then actuated to raise the piston rod 105 and the gauge plate 102 and position the coupling as shown in full lines in FIG. 4 where it is immediately clamped and is ready to be threaded. As soon as the coupling is clamped in the self-centering mechanism the gauge plate 102 is retracted and the casting is revolved in a counter clockwise direction on the pivots 108 to bring it in the position as shown in FIG. 2.

Thus the coupling loading and unloading mechanism 5 is actuated just as soon as the coupling is released from the chuck and falls to the coupling unloading platform 107 at which time the casting is revolved to deposit the threaded coupling on the conveyor 114 and at the same time supply the next consecutive coupling to the chuck. The coupling is ordinarily loaded when the chuck is fully extended which is controlled by the operation of the rapid traverse motor 42 moving the crosshead 60 which is counterbalanced by the force of the pistons 62 within the cylinder 54. At this time the spider 51 and the tap sleeve 55 are extended and independently counterbalanced by the pistons 53. When the unthreaded coupling is raised by the rapid traverse and sleeve 35 is again rotated to rotate the shaft 48 to raise and to engage the coupling on the hard ring 50 thereby locating the initial starting place for the thread chasers in the tapping mechanism. Thus the pistons 62 not only function to locate the chuck and blank coupling but also function as a counter balance for the weight of the chuck of the connecting rods 64 and the cross head 60.

The sequence of operation of this machine is initiated by depressing a starting cycle pushbutton that energizes the cylinder 112 to move the indexing head from the position shown in FIG. 2 to the position shown in FIG. 4 to place the coupling in readiness for insertion in the machine. When the indexing unit or coupling loading mechanism moves the coupling to the vertical position as shown in FIG. 4 it will engage a limit switch having one normally open circuit and one normally closed circuit. The normally open circuit energizes the cylinder 106 to raise the coupling 41 to the position shown in FIG. 4. The normally open circuit also completes a timer circuit providing a two second delay after which the servomotor is caused to close the chuck on the coupling. The timer contact also starts a second timer which after its time delay starts the rapid traverse motor 42 moving the chuck upwardly. The cylinder 54 is energized to add a counterbalance pressure on the pistons 62 to compensate for the weight of the crosshead 60.

As the carriage moves upwardly and the coupling approaches the spider 50 a limit switch is actuated which stops the rapid traverse motor 42 and starts the spindle 7 to rotate and also starts the coolant pump motors to provide the cutters with lubricant. As the spindle rotates the feed shaft 30 rotates the threaded shaft 48 to raise the crosshead 60 and the chuck further moves the coupling upwardly under the mechanical feed from the spindle motor. The coupling engages the spider and moves the tap sleeve 55 upwardly and the thread chasers cut the thread on a taper. After the required length of thread is cut, the limit switch is engaged which collapses the tap to withdraw the thread chasers and also stops the spindle and the coolant motors as well as starts the rapid traverse motor to move the crosshead and chuck down. As the chuck descends a limit switch is engaged closing the circuit to energize a servomotor to reset the tap in the core 38. When the chuck reaches the position where the coupling engages the ring 50 on the spider 51 no action takes place but the chuck continuously moves downwardly away from engagement with the ring on the spider and to a lower or shifting position where it energizes another limit switch which stops the rapid traverse down, withdraws the locking pin 88 and energizes the servomotor 92 to roll the chuck over and reset the locking pin. When the chuck has rolled over it engages another limit switch and starts the rapid traverse motor to raise the chuck a second time and the threading operation proceeds on the opposite side of the coupling in the same manner as above described. At the end of the threading operation the chuck then lowers the second time. The locking pin 88 is not removed this time at the loading position but a limit switch is engaged to stop the rapid traverse down and open the chuck. At this time the timer is energized which after a time delay moves the indexing unit to discharge the coupling just threaded and at the same time the unit is indexed to load the next coupling. When the threading is started on the new coupling the index unit is energized by the limit switch that turns off the rapid traverse and starts the rotation of the spindle 7 as before. The spindle will also move the indexing unit back to the position as illustrated in FIG. 2. In this manner the thread cutting machine may be automatically operated in its complete cycle. The circuits just described are of course also provided with manual control for replacing this automatic sequence of operation.

I claim:

1. A thread cutting machine consisting of a main frame, a vertically disposed rotary spindle carried by said main frame, a sleeve slidably splined for axial movement within said rotary spindle, a thread chasing core secured to said spindle and splined in said sleeve to rotate with said spindle and sleeve, thread chasers carried by said core and movable radially due to the relative sliding movement of said sleeve over said core within said spindle, a nonrotary spider having rotary engagement with the end of said rotary sleeve, fluid pressure actuated piston means supporting a portion of the weight of said spider and said sleeve when subjected to a predetermined fluid pressure, work-holder means for supporting a workpiece in engagement with said spider and under the thread chasing core, a feed drive including a rotary driven feed screw carried by said frame and a nut threaded on said feed screw, said nut rotatably mounted on said work-holder means for raising said work-holder means and workpiece upwardly over said core and to push said sleeve relative to said thread chasing core to cut threads on the workpiece along a taper, and a rapid traverse including a rotary driven worm means on said work-holder means connected to rotate said nut to drive it along said feed screw to lower said work-holder and workpiece and to lower said sleeve and retract the workpiece from around said thread chasing core.

2. The thread cutting machine of claim 1 characterized in that said work-holder means includes a crosshead which supports the rapid traverse at the upper end of the machine and said work-holder means includes a chuck at the lower end of the machine, rods interconnecting said crosshead and said chuck and guides carried by said main body for guiding the movement of said rods.

3. The thread cutting machine of claim 1 characterized by a fluid pressure actuated piston means engaging said work-holder means to counterbalance the weight of said work-holder means and the workpiece.

4. The thread cutting machine of claim 3 characterized in said fluid presure actuated piston means for supporting a portion of the weight of said spider and said fluid pressure actuated piston means effective on said work-holder being disposed within a common cylinder means with a division wall separating the fluid pressure chambers of said piston means from each other.

5. The thread cutting machine of claim 1 characterized by a common drive means for rotating said rotary spindle and operating said feed drive.

6. The thread cutting machine of claim 1 characterized in that said rapid traverse includes an independent motor connected to drive said worm means and rotate said nut on said feed screw, said nut being rotatably mounted in said work-holder means and held against axial movement therewith and a rotary shaft actuated by said feed drive threadably engaged in said nut.

7. The thread cutting machine of claim 3 characterized in that said rapid traverse includes an independent motor means directly connected to said worm means on said internally threaded nut to prevent relative longitudinal movement between said nut and said work-holder means when not rotating and when rotating to provide rapid rotation of said nut relative to said threaded shaft to rapidly move said work-holder means relative to said thread chasing core.

8. The thread cutting machine of claim 1 characterized in that said work-holder means includes a self-centering chuck having an open centered outer frame, an open centered intermediate frame movable within the open center of said outer frame on horizontal slide bearing surfaces therebetween to provide limited lateral movement, deformable resilient means carried by one of said frames and interposed between said frames to pre-position said intermediate frame, an open centered chuck frame slidable horizontally within the open center of said intermediate frame, guides on one side of said chuck frame, interengaging complementary guides on said intermediate frame, links pivotally connected on said chuck and intermediate frames to permit relative longitudinal movement between said frames, said links and guides permitting relative movement at substantial right angles to the lateral movement afforded by the resilient means, and pressure actuated jaws slidably mounted in said chuck frame for holding the workpiece.

9. The thread cutting machine of claim 8 characterized in that said chuck frame is open centered, a chuck member rotatably mounted in the opening of said chuck frame, said chuck member slidably supporting said jaws for said workpiece and means to rotate said chuck member, and means to actuate the jaws of said clamp.

10. A self-centering chuck comprising, an open centered outer frame, an open centered intermediate frame within the open center of said outer frame, opposed mating slide bearing surfaces at the ends of said outer and said intermediate frames to engage each other to entrain the latter for limited lateral movement within and relative to said outer frame, deformable resilient means carried by one of said frames and interposed between said frames to pre-position said intermediate frame, an open centered chuck frame having longitudinally disposed guide means on one side thereof and links on the other side thereof to permit relative longitudinal movement between said chuck frame and said intermediate frame, said links and guides permitting relative movement at substantial right angles to the lateral movement afforded by the resilient means, aligned bearings carried by said chuck frame, an open centered chuck member having oppositely disposed shafts journaled in said aligned bearings, a lock means between said chuck frame and said chuck member to prevent the latter from rotating, rotary actuating means carried by said outer frame to rotate one shaft on said chuck member when said lock is disengaged, chuck grip blocks slidable in said chuck member, and fluid pressure means operable through one of said shafts for operating said chuck grip blocks.

11. The thread cutting machine of claim 1 which also includes a work loading mechanism mounted on said main frame below said work-holder, a work receiving and loading gauge plate and a work discharge plate mounted on a pivotal frame, motor means to oscillate said frame to swing a workpiece on said work discharge plate from said machine and simultaneously swing a workpiece on said gauge plate into position for said work-holder.

12. The machine of claim 11 characterized in that said work supporting plates are pivoted on a horizontal axis and disposed at an angle relative to each other, said work support gauge plate being mounted on the end of a piston for extending the work into the work-holder and having a center guide to retain the work when traveling through its oscillating position.

13. A thread cutting machine comprising a main frame, a rotary spindle carried by said main frame, a sleeve slidably splined for axial movement within said rotary spindle, a thread chasing core secured in said spindle to be held against axial movement and rotatably supported from said main frame and having a splined connection in said sleeve to rotate therewith, a link pivotally connected between said sleeve and said core, thread chasers carried by said core and movable radially due to relative sliding movement of said sleeve over said core to actuate said link, counterbalance means having a spider to engage and rotatably support said sleeve, a work-holder means for supporting a workpiece coaxially aligned with said thread chasers, a feed drive including a feed screw secured to said spindle and a nut threaded thereon and supported by said work-holder means for moving said work-holder means and a workpiece therein to engage said spider through said rotary connection and move said sleeve relative to said core to cut threads in said workpiece.

14. The thread cutting machine of claim 13 characterized by a common drive for rotating said spindle and said feed screw.

15. The thread cutting machine of claim 13 which also includes an independent rapid traverse motor connected to rotate said nut to move said work-holder rapidly in either direction.

16. The thread cutting machine of claim 15 characterized in that said feed drive includes a screw driven by the same source of power as said rotary spindle and said rapid traverse includes a rotary threaded nut mounted against axial movement relative to said work-holder means and rotatably supported for being driven from an independent drive.

17. A hollow workpiece loading and unloading machine consisting of two flat supporting plates including a loading support plate and an unloading support plate mounted at an angle relative to each other on a single frame, a work centering disc on said loading support plate, a piston on said frame carrying said loading support plate to extend and retract the same relative to said frame, a shaft supporting said frame for oscillation to position the first and loading support plate for receiving workpieces to load while the second and unloading support plate is in position to receive and unload the same workpieces, power actuated means for swinging said frame to position the loading support plate with the work thereon and extend the same by said piston for loading into the machine while the unloading support plate discharges the workpiece from the machine.

18. A thread cutting machine rotatably supporting a spindle having secured thereto and rotatable therewith thread chasers on a core and held against axial movement, spline means in said spindle and on said core to interengage and slidably receive a workpiece actuated sleeve connected to radially move the thread chasers in cutting a tapered thread, a movable work-holder means for supporting the workpiece, a carriage supporting said work-holder means, feed drive means for moving said carriage and said work-holder means toward and away from said core to slide said sleeve in said spline means on said sleeve and said core and cause said chasers to cut threads on the workpiece along a taper when moving toward said core, bearing means to support said spindle on a vertical axis, said feed drive means including a feed screw secured to said spindle and a nut threaded thereon and supported against longitudinal movement on said carriage, a fluid pressure actuated means mounted on said thread cutting machine, a spider carried by said fluid pressure actuated means and engaging said sleeve to support a portion of the weight of said sleeve, and counterbalance means between said carriage and said thread cutting machine to counterbalance said carriage and workholder means and relieve the weight of the work and the tool actuating on said feed drive means.

19. A thread cutting machine rotatably supporting a spindle having secured thereto and rotatable therewith thread chasers on a core and held against axial movement, spline means in said spindle and on said core to interengage and slidably receive a workpiece actuated sleeve connected to radially move the thread chasers in cutting a tapered thread, a movable work-holder means for supporting the workpiece, a carriage supporting said work-holder means, feed drive means for moving said carriage and said work-holder means toward and away from said core to slide said sleeve in said spline means on said sleeve and said core and cause said chasers to cut threads on the workpiece along a taper when moving toward said core, bearing means to support said spindle on a vertical axis said feed drive means including a feed screw secured to said spindle and a nut threaded thereon and supported against longitudinal movement on said carriage, a fluid pressure actuated means mounted on said thread cutting machine and connected to said carriage to support the weight of said carriage and the members connected therewith to counterbalance the same and relieve the weight of the work and the tool actuating on said feed drive means.

20. The thread cutting machine of claim 19 characterized by a second fluid pressure actuated means mounted on said thread cutting machine, and a spider carried by said fluid pressure actuated means and engaging said sleeve to support a portion of the weight of said sleeve.

21. The thread cutting machine of claim 19 characterized by a spindle motor connected to rotate said spindle and selectively rotate said feed drive means, and an independent rapid traverse motor means connected to selectively rotate said feed drive means.

22. A thread cutting machine rotatably supporting a spindle having secured thereto and rotatably therewith thread chasers on a core and held against axial movement, spline means in said spindle and on said core to interengage and slidably receive a workpiece actuated sleeve connected to radially move the threaded chasers in cutting a tapered thread, a movable work-holder means for supporting the workpiece, a carriage supporting said work-holder means, feed drive means for moving said carriage and said work-holder means toward and away from said core to slide said sleeve in said spline means on said sleeve and said core and cause said chasers to cut threads on the workpiece along a taper when moving toward said core, bearing means to support said spindle on a vertical axis, a fluid pressure actuated means mounted on said thread cutting machine and connected to said carriage to support the weight of said carriage and the members connected therewith, a spindle motor connected to rotate said spindle and selectively rotate said feed drive means, an independent rapid traverse motor means connected to selectively rotate said feed drive means, said feed drive means including a threaded shaft, a rotary nut on said carriage threadably connected to said threaded shaft and operable by said rapid traverse motor means to raise and lower said carriage on said threaded shaft, said threaded shaft being independently rotated by said spindle motor.

23. A machine tool consisting of a frame, a vertically disposed rotary spindle carried by said frame, tool means actuated by said spindle, a workpiece cooperating carriage mounted on said frame for vertical movement to raise and lower with a workpiece relative to said tool means which operates on the workpiece, a cylinder fluid actuated piston means secured to said workpiece cooperating carriage and operatively mounted in said frame for supporting the weight of said workpiece cooperating carriage and assuming a portion of the work load of said tool means on the workpiece, a rotary feed screw rotatably mounted on said frame, a rotary nut threaded on said feed screw and rotatably mounted on said carriage, a rotary driven worm mounted on said frame and connected to drive said feed screw for raising said workpiece cooperating carriage, and a second rotary driven worm mounted on said carriage and connected to drive said nut up and down said feed screw for rapidly raising and lowering said carriage.

24. The machine tool of claim 23 which also includes a tool operating member slidably supported on said frame and engaged by the workpiece mounted on the carriage for controlling the operation of the machine tool on the workpiece when raised by said rotary driven worm operating said feed screw, and a second cylinder fluid actuated piston means mounted in said frame for supporting the weight and load of said tool operating member.

25. The machine tool of claim 23 characterized in that said workpiece cooperating carriage has a chuck means to support the workpiece.

References Cited in the file of this patent
UNITED STATES PATENTS

| | | |
|---|---|---|
| 1,764,717 | Fownes et al. | June 17, 1930 |
| 1,933,225 | Smith | Oct. 31, 1933 |
| 1,967,507 | Hibbard | July 24, 1934 |
| 2,024,278 | Drissner et al. | Dec. 17, 1935 |
| 2,116,639 | Protin | May 10, 1938 |
| 2,191,915 | Protin | Feb. 27, 1940 |
| 2,299,302 | Bullard et al. | Oct. 20, 1942 |
| 2,381,441 | Drissner et al. | Aug. 7, 1945 |
| 2,548,786 | Harney | Apr. 10, 1951 |
| 2,630,724 | Saives | Mar. 10, 1953 |
| 2,660,738 | Hieber | Dec. 1, 1953 |
| 2,811,267 | Bock | Oct. 29, 1957 |
| 2,932,041 | Benninghoff | Apr. 12, 1960 |
| 3,041,641 | Hradek et al. | July 3, 1962 |